(12) United States Patent
Vasa

(10) Patent No.: US 7,155,195 B2
(45) Date of Patent: Dec. 26, 2006

(54) INPUT AND OUTPUT FILTERING SYSTEM FOR A DIRECT CONVERSION RECEIVER

(75) Inventor: John E. Vasa, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 391 days.

(21) Appl. No.: 10/172,239

(22) Filed: Jun. 14, 2002

(65) Prior Publication Data

US 2003/0232611 A1    Dec. 18, 2003

(51) Int. Cl.
H04B 1/26 (2006.01)

(52) U.S. Cl. .............. 455/324; 455/140; 455/197.2

(58) Field of Classification Search .......... 455/324, 455/306, 43, 131, 132, 140, 141, 147, 196.1, 455/197.1, 2, 313, 323, 334, 338, 339
See application file for complete search history.

(56) References Cited

U.S. PATENT DOCUMENTS

| | | | | |
|---|---|---|---|---|
| 4,039,980 A | * | 8/1977 | Nagahama | 333/174 |
| 5,483,691 A | * | 1/1996 | Heck et al. | 455/234.2 |
| 5,640,698 A | * | 6/1997 | Shen et al. | 455/323 |
| 5,687,101 A | * | 11/1997 | Lee | 702/190 |
| 6,023,609 A | * | 2/2000 | Futamura | 455/82 |
| 6,337,976 B1 | * | 1/2002 | Kudou | 455/258 |
| 6,498,927 B1 | * | 12/2002 | Kang et al. | 455/245.2 |
| 6,810,266 B1 | * | 10/2004 | Ecklund et al. | 455/553.1 |
| 6,977,976 B1 | * | 12/2005 | Birkett et al. | 375/345 |
| 2003/0104797 A1 | * | 6/2003 | Webster et al. | 455/296 |
| 2003/0194981 A1 | * | 10/2003 | Rimini et al. | 455/234.1 |

OTHER PUBLICATIONS www.woodanddouglas.co.uk/products/downbad/an010.pdf.

* cited by examiner

*Primary Examiner*—Edward F. Urban
*Assistant Examiner*—Nhan T. Le
(74) *Attorney, Agent, or Firm*—Thomas, Kayden, Horstemeyer & Risley, LLP

(57) ABSTRACT

A direct conversion receiver including a filtering system for improving signal reception in the receiver is disclosed. In one embodiment, the direct conversion receiver comprises a first filter adapted to receive a plurality of receive signals comprising a receive band. The first filter is configured to attenuate a frequency range of the receive band to de-emphasize signals within of the frequency range. The direct conversion receiver also comprises a second filter coupled to a signal processing logic output and is configured to amplify the signals in the frequency range of the receive band, the signal processing logic being coupled to the output of the first filter and configured to substantially attenuate a plurality of unwanted signals in the receive band.

8 Claims, 3 Drawing Sheets

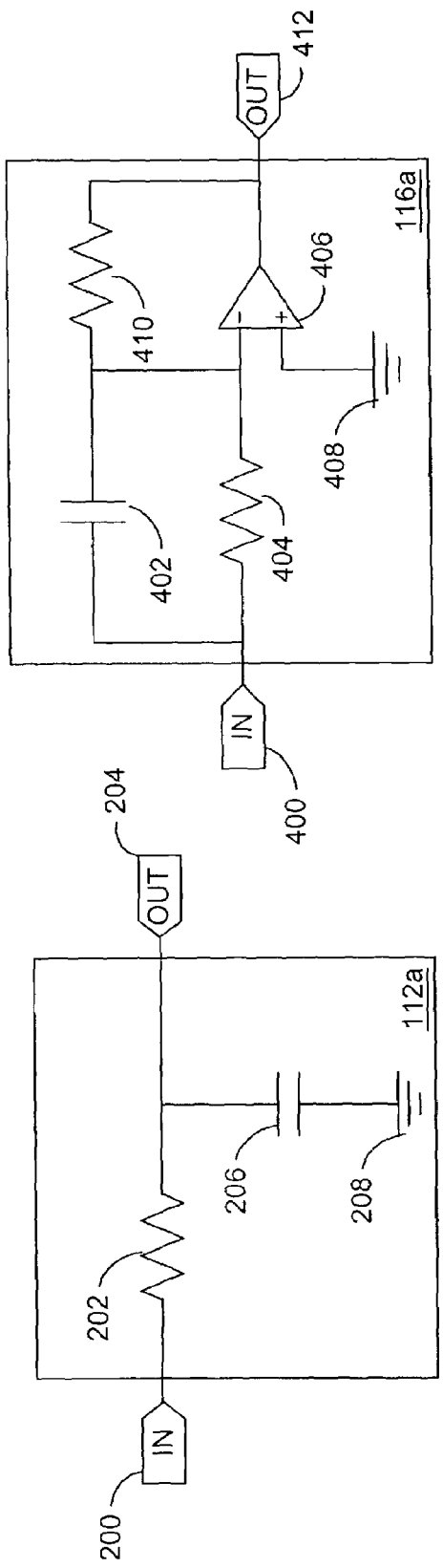
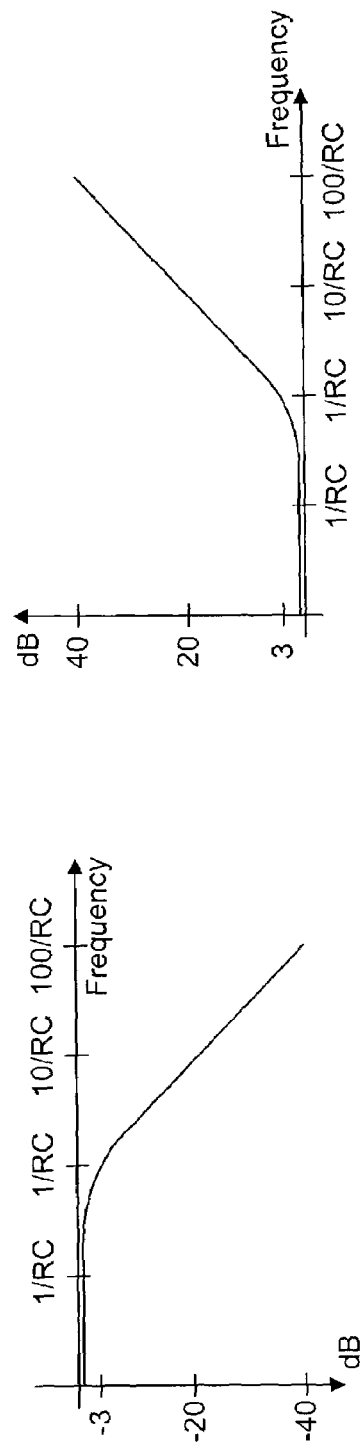

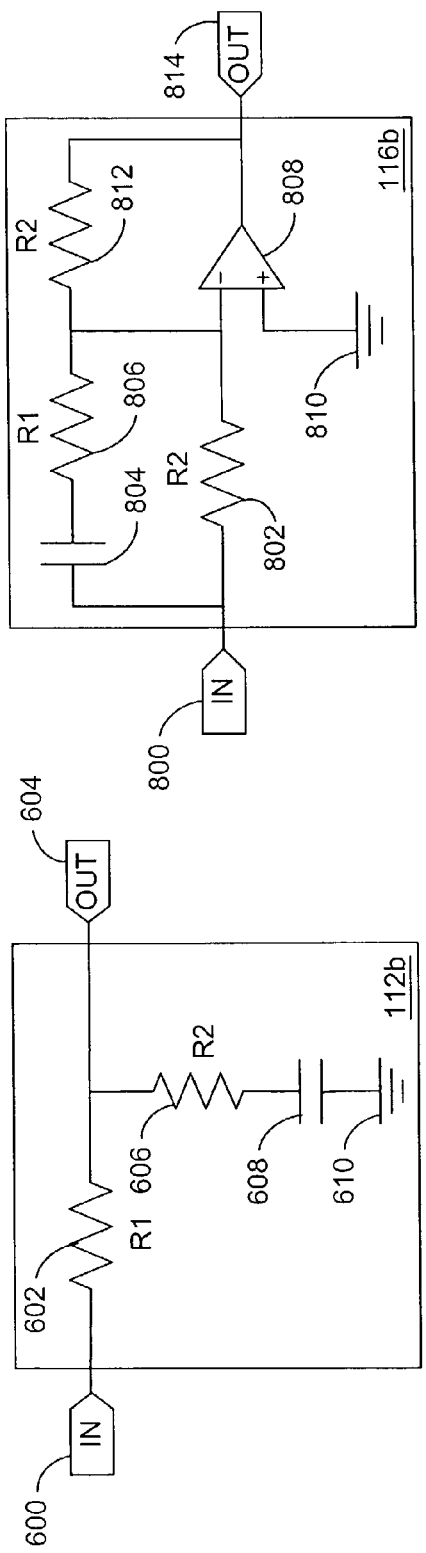
TRANSFER FUNCTION = $\dfrac{1 + s(R1 + R2)C}{1 + sR1C}$
FIG. 8
FIG. 9
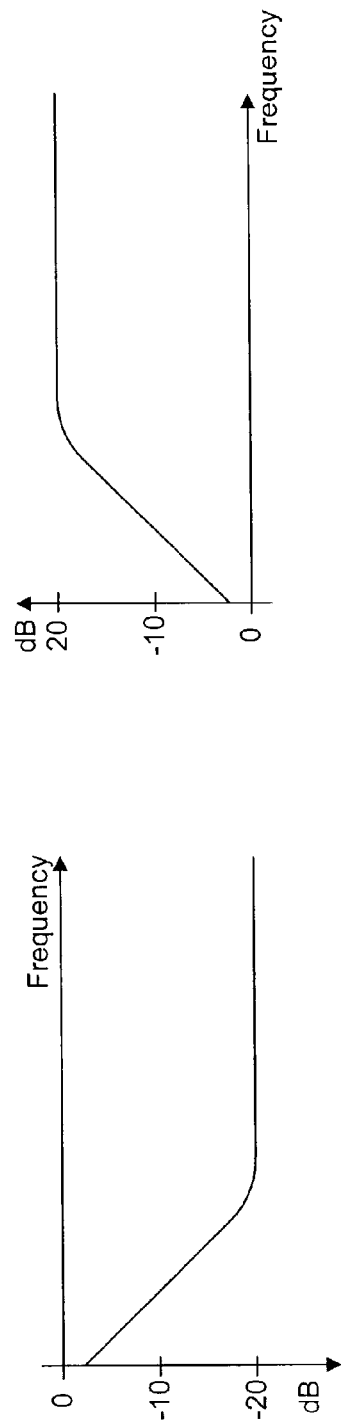
TRANSFER FUNCTION = $\dfrac{1 + sR1C}{1 + s(R1 + R2)C}$
FIG. 6
FIG. 7

INPUT AND OUTPUT FILTERING SYSTEM FOR A DIRECT CONVERSION RECEIVER

BACKGROUND OF THE INVENTION

1. Field of the Invention

The present invention is generally related to receivers and, more particularly to a system and method for filtering the baseband signal in a receiver.

2. Related Art

Wireless technology has undergone vast improvements in the last several years, both in terms of communication theory and hardware design. Improved hardware has sped the development of digital communications, and the digital nature of the communications link has allowed engineers to transfer larger amounts of data across a wireless link. Moreover, the improvements in hardware have allowed transmitters and receivers to operate at higher and higher frequencies, thus making even higher data rates possible.

In the push to operate at higher frequencies, the hardware has become exceedingly complex, and the signal to noise ratio (SNR) requirements have become more stringent in terms of narrow pass bands and steep selectivity for filtering devices. In making receivers comply with these requirements, development has focused on two primary methods of converting the high frequency radio signals to baseband (i.e. DC) signals, from which the communications information can be extracted. These two methods are the so-called super-heterodyne receiver, and the direct conversion receiver.

In the super-heterodyne receiver, the receiver receives the high frequency radio signal and converts it down to baseband through at least one intermediate frequency (IF). At the intermediate frequency, the receiver filters out a majority of the noise from the adjacent channels (both upper and lower). The filtering is done at intermediate frequencies because high frequency filters are expensive and generally difficult to realize because the bandwidth, as the percentage of the center frequency, is very low. Thus, lowering the high frequency signal to an intermediate frequency allows the designer to use realizable filters. Generally these filters take the form of intermediate frequency surface acoustic wave (IF SAW) filters. However, these filters are expensive and are physically large.

In contrast, the direct conversion receiver (DCR), directly converts the received high frequency radio signal to a baseband signal, rather than converting through one or more intermediate frequency steps. Thus the IF SAW filters are not required. This saves a substantial amount of cost and reduces the size of the receiver. The channel filtering is achieved by using active low pass filters. These active low pass filters can be integrated on a chip along with the other receiver elements, thus reducing cost and size. However, unlike the IF SAW filters (which are passive and hence noiseless), the active filters are quite noisy.

Further, these active low pass filters have a limited dynamic range. Dynamic range is defined as the difference between the noise floor of the filter and the maximum signal level of an adjacent channel that can be tolerated. The dynamic range requirement of the active filters determines important design parameters such as the size and current consumption of these components. A larger size chip typically equates to higher cost, and minimizing current consumption in battery powered portable units is very important in prolonging battery life. As such, one skilled in the art can see that, although direct conversion receivers are a conceptually simpler solution to the high frequency radio receiver, in practice direct conversion receivers can be more difficult to efficiently implement.

Most of the focus in the development of direct conversion receivers has centered on achieving a high dynamic range in a small size and low cost. When inexpensive, single pole filters are included in the design, the adjacent channels are suppressed by only a few decibels (dBs). For this reason, typical designs include filters that have a steep selectivity curve to allow the desired signal to pass, while attenuating the unwanted adjacent signals. However, the filters that allow this type of steep selectivity are typically very expensive. Thus, there exists a need in the industry for an effective and inexpensive filtering device, which adds very little noise to the overall system.

SUMMARY

An embodiment of the invention comprises a direct conversion receiver configured to enhance reception of a receive signal band. In one embodiment, the invention comprises a plurality of receive signals comprising a receive band, and a first and second filter. The first filter is adapted to receive the plurality of receive signals, and is configured to attenuate a frequency range of the receive band to de-emphasize signals within the frequency range. The second filter is coupled to the output of a signal processing logic and configured to amplify the signals in the frequency range of the receive band, wherein the signal processing logic is coupled to the output of the first filter and is configured to substantially attenuate a plurality of unwanted signals in the receive band.

Another embodiment of the invention comprises a filter configured to receive a receive band, the receive band being at a baseband frequency and comprising a plurality of signals. The filter is also configured to filter out a plurality of unwanted signals from the plurality of signals and configured to produce a desired signal, wherein the filter has a pole frequency that is located within a frequency range of the desired signal. The location of this pole frequency thereby enhances the attenuation of the plurality of unwanted signals prior to processing the desired signal in a direct conversion receiver signal processing logic.

Another embodiment of the invention comprises a plurality of receive signals comprising a receive band and a flicker noise signal, a first filter and a second filter. The first filter is adapted to receive the receive band and configured to pass a plurality of low frequency signals substantially unaltered, while providing a constant attenuation value for a plurality of high frequency signals. The second filter is coupled to a signal processing logic output and configured to amplify the high frequency signals that were attenuated by the first filter to yield a desired signal. The signal processing logic being coupled to the output of the first filter and configured to attenuate the plurality of receive signals such that substantially only one signal remains.

Another embodiment of the invention includes a method for enhancing reception on a direct conversion receiver. This method comprises attenuating a plurality of signals in a frequency range of a receive band, performing intermediate filtering on the receive band, amplifying the plurality of signals in the frequency range, and providing a desired baseband signal.

Another embodiment of the invention includes a method comprising receiving a receive band, comprising a plurality of signals, and attenuating the receive band, such that a plurality of unwanted signals are rejected along with a portion of a desired signal, wherein a portion of the desired signal is allowed to pass.

Another embodiment of the invention includes a method comprising receiving a receive band, the receive band comprising a plurality of signals, attenuating a frequency range of the plurality of signals, such that the frequency range is de-emphasized with respect to signals outside of the frequency range, providing signal processing to substantially remove a plurality of unwanted signals from the receive band, and amplifying the frequency range of the plurality of signals, such that the attenuated frequency range receives amplification substantially equal to the attenuation received in the attenuating step.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2 is a schematic diagram of one embodiment of the input filter of the present invention, as shown in FIG. 1.

FIG. 3 is a graph illustrating the transfer function of the input filter shown in FIG. 2.

FIG. 4 is a schematic diagram of one embodiment of the optional output filter as shown in FIG. 1.

FIG. 5 is a graph illustrating the transfer function of the output filter shown in FIG. 4.

FIG. 6 is a schematic diagram of an alternative embodiment of the input filter as shown in FIG. 1.

FIG. 7 is a graph illustrating the transfer function of the input filter shown in FIG. 6.

FIG. 8 is a schematic diagram of an alternative embodiment of the output filter as shown in FIG. 1.

FIG. 9 is a graph illustrating the transfer function of the output filter shown in FIG. 8.

DETAILED DESCRIPTION

Figure 1:
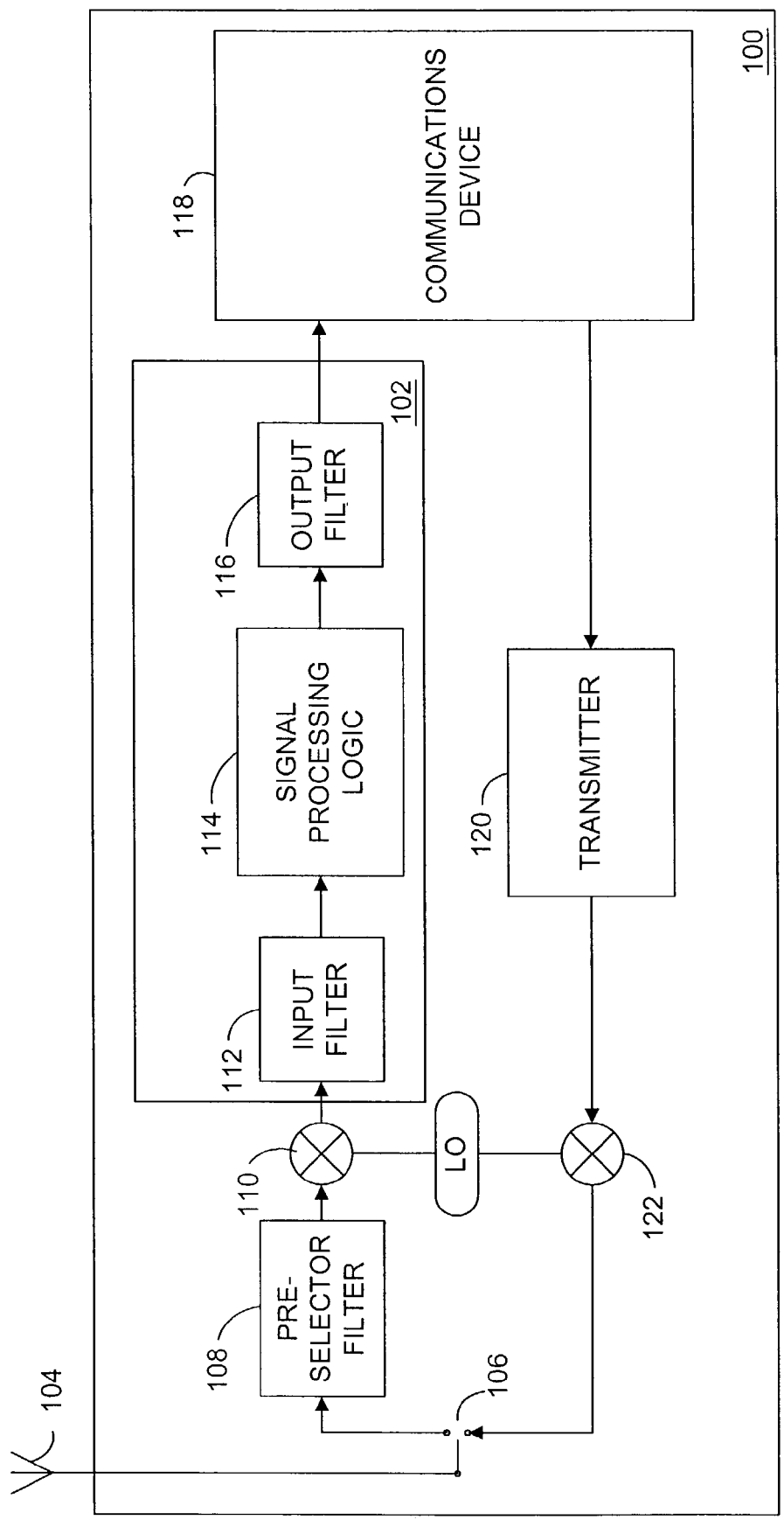
FIG. 1 is a block diagram of a portion of radio receiver constructed in accordance with an embodiment of the present invention.

FIG. 1 shows a simplified block diagram of a portion of a radio device 100 of which the direct conversion receiver 102 forms a part. This embodiment discusses the invention with regard to a low pass environment, wherein the receive signals have been converted to baseband prior to the filtering steps. However, one skilled in the art will recognize that the teachings of the present invention can be adapted for use in a plurality of different environments, including environments where bandpass and even highpass filtering is called for.

The antenna 104 receives a high frequency signal from another radio device and directs the signal to the receiver electronics of the radio device 100. The high frequency signal is typically referred to as a "radio frequency" (RF) signal. Switch 106 is switched according to whether the receiver is transmitting or receiving a signal in this half-duplex radio. Alternatively, a full-duplex radio could be utilized in accordance with the invention by replacing switch 106 with a diplexer. The diplexer, as known to those skilled in the art, can be used to simultaneously pass transmit and receive signals to and from the antenna.

A pre-selector filter 108 receives the RF signal and filters out all but the desired frequency band. Because filtering at high frequencies leads to expensive filters and higher power consumption, radios typically immediately convert the signal down to another frequency using a down-converter 110, which can alternatively be a mixer or demodulator. In direct conversion receivers the signal from the pre-selector filter is down-converted to baseband. In contrast, the super-heterodyne architecture down-converts the receive signal to a frequency between baseband and the received frequency, before ultimately converting the receive signal to baseband.

During the down-conversions by the down-converter 110, however, the desired frequency band becomes compressed. The desired frequency band typically comprises a plurality of data or voice signals, each occupying a different channel in the desired frequency band. Therefore, when the desired frequency band becomes compressed, each of the signals moves closer together. Therefore, filtering becomes more complex because the filters have to exhibit more selectivity in order to filter out the upper and lower adjacent unwanted signals from the desired signal. This increased complexity is the reason that super-heterodyne systems are often used in conjunction with high frequency communication standards.

The super-heterodyne architecture, which first converts the received RF signal to an intermediate frequency, generally uses a pair of intermediate frequency surface accoustic wave (IF SAW) filters to gain the selectivity required by most high frequency communication standards. However, the active IF SAW filters are expensive, and, moreover, active filters add significant noise to the signal. One way to reduce the expense and power consumption would be to find a method whereby the receiver could directly convert the signal to baseband, and then filter the signal in baseband while maintaining the required selectivity.

However, obtaining the selectivity required by many communication standards is difficult. The difficulty is introduced because of the close proximity of the plurality of voice/data signals caused by the conversion from RF to baseband, and the addition of the phenomenon of 1/f noise, or flicker noise, at the lower frequencies. Flicker noise can generally be described as a noise phenomenon which has a power spectrum that behaves according to the inverse of a signal frequency and is thought to be caused by material inhomogeneity in semiconductors. Thus, flicker noise is strongest at low frequencies and weaker at higher frequencies.

In general, the most common method for increasing filter selectivity is through the use of active filtering devices. However, active filters are more expensive and, considering that active filters are very noisy, in most applications the added expense is unjustified. Therefore, most solutions use passive filters. In accordance with one embodiment of the invention, among others, an input filter 112 is used to reduce the dynamic range requirement of the signal processing logic 114 of the direct conversion receiver 102. The input filter 112 will be further described below, in alternative embodiments, as input filter 112a and input filter 112b.

With regard to the rejection of the adjacent signals, using an RC input filter generally filters out the unwanted signals, while leaving the desired signal completely unaltered by the RC input filter. In this way the maximum signal strength is maintained while the adjacent signals are rejected as much as possible. However, when a pole of the RC input filter 112 is placed at the edge of the frequency band containing the desired signal, the adjacent channels receive very little attenuation. Thus, the dynamic range requirement of the signal processing logic 114 remains quite large, increasing the cost, complexity and size of the signal processing logic 114.

However, it is possible to locate the center frequency of the input filter 112 within the frequency band of the desired signal. Locating the center frequency of the input filter 112 within the frequency band of the desired signal results in an attenuation of at least a portion of the desired signal in order to achieve greater rejection of the unwanted signals on the adjacent channels. Thus, although the strength of the desired signal is reduced by the input filter 112, the strength of the unwanted signals are reduced even further. This reduction in the strength of the unwanted signals yields a notable reduction in the amount of dynamic range required in the direct conversion receiver 102, making the reduction in the signal strength of the desired signal acceptable.

Further, after attenuating the signal band with an input filter 112 at the input stage of the direct conversion receiver 102, the direct conversion receiver 102 uses signal processing logic 114 to substantially attenuate unwanted signals in the receive band falling outside of the bandwidth of the desired signal. An output filter 116, which amplifies the portions of the signal that were attenuated with respect to the input filter 112, restores the desired signal band strength. Because of the intermediate filtering step performed by the signal processing logic 114 of the direct conversion receiver 102, the desired signal can be amplified by the output filter 116. Two embodiments of the output filter 116 will be described below with respect to output filter 116a and 116b. The output filter 116 amplifies the desired signal without amplifying the same adjacent channels that were problematic in the original signal. After processing the signal, the direct conversion receiver 102 sends the processed signal to a communications device 118. The communications device 118 can be any communications system operating at baseband frequency. The communications device 118 can also have the ability to transmit information via the transmitter 120 and modulator 122.

FIG. 2 is a schematic diagram showing one embodiment, among others, of an RC input filter 112a that could be used in conjunction with an embodiment of the invention. One skilled in the art will immediately recognize this RC filter 112a as a first order RC filter, having a single pole at the frequency denoted by 1/RC, where R is the resistance of the resistor 202 in ohms, and C is the capacitance of the capacitor 206 in farads. The input 200 is first directed across a resistor 202. The other side of the resistor 202 is connected to both the output 204 and a capacitor 206. The other side of the capacitor is connected to ground 208. The transfer function of the RC filter 112a can be found by using the impedances of the components of the circuit, and deriving the voltage drop between the input and the output. The transfer function of the RC input filter 112a is given by the equation:

$$TransferFunction = \frac{1}{1+sRC}$$

where "R" and "C" are the resistance and capacitance values of the resistor 202 and capacitor 206, respectively, and s=jω, and ω is the angular frequency of the signal.

FIG. 3 shows is a Bode plot of the transfer function of the circuit in FIG. 2. One skilled in the art will recognize the characteristic flat response at low frequencies (below the frequency corresponding to the 1/RC pole), and the characteristic −20 dB/decade downward slope in the frequency range above 1/RC.

In former designs, the desired signal would occupy the frequencies up to 1/RC. However, in the IS 95 CDMA standard, for example, the desired signal occupies frequencies up to 630 kHz, while there is an adjacent channel at 900 kHz. Designing the pole to occur at 630 kHz allows for 3.854 dB of rejection at that frequency. When considering that the specifications of the IS 95 CDMA standard allow for the adjacent channel to be 71 dB above the desired signal, 3.854 dB of rejection is negligible. This negligible rejection leads to higher selectivity from the signal processing logic 114 (FIG. 1), which means having a greater dynamic range. If, however, the adjacent channel strength can be reduced by a greater amount, the rejection power of the signal processing logic 114 (FIG. 1) can be reduced, while still adequately attenuating the adjacent channels. Thus, the dynamic range of the signal processing logic 114 (FIG. 1) can be reduced.

FIG. 4 shows a schematic diagram showing one embodiment, among others, of an output filter 116a that could be used in conjunction with an embodiment of the invention. The input signal 400 is connected to a capacitor 402 and a resistor 404 is connected in parallel to capacitor 402. An operational amplifier (op-amp) 406 is coupled to the capacitor 402 and resistor 404. The non-inverting input of the op-amp 406 is connected to a ground 408, while the inverting input of the op-amp 406 is connected to a second resistor 410, which is also connected to the output terminal of the op-amp 406, and which forms the output 412 of the filter 116a. The transfer function of filter 116a is characterized by the equation:

$$TransferFunction = 1+sRC$$

where "R" and "C" are the resistor and capacitor values, and s=ωj.

FIG. 5 shows is a Bode plot of the transfer function of the circuit shown in FIG. 4. One skilled in the art will immediately recognize this function as the inverse of the transfer function shown in FIG. 3. The plot shows the characteristic flat response for a signal having a frequency lower than the frequency of the pole. The pole frequency for this filter occurs at 1/RC. Furthermore, this transfer function shows the characteristic +20 dB/decade slope. Although this embodiment shows a differential, or balanced, circuit pair, the circuits need not necessarily be balanced.

Referring back to FIG. 1, similar filtering techniques may be used to reduce the flicker noise phenomenon. The same receiver structure applies to the solution of the flicker noise phenomenon. Because complementary metal-oxide-semiconductor (CMOS) logic, used in the direct conversion receiver, is inherently susceptible to the flicker noise phenomenon, and due to the immediate conversion to baseband of the incoming signal, it is preferable to increase the power level of the low frequency signals relative to the higher frequency signals. This is done to facilitate processing of the lower frequency signals to remove some of the flicker noise. Therefore, to compensate for the flicker noise, the input filter 112 can be implemented as a low pass filter. However, the input filter 112 is used to reduce the flicker noise phenomena in the low frequency areas, which are the most problematic. Thus, the input filter has a somewhat different transfer function than the filter shown in FIG. 2. The invention also uses an output filter 116 having a high pass characteristic, which amplifies the high frequency signals back to the original signal level. However, this filter/amplification occurs after the signal processing logic 114 since, at this point, the noise from the op-amp will not affect the SNR of the system.

Referring now to FIG. 6, shown is a schematic diagram of the input filter 112b of one embodiment, among others, of the present invention. The input 600 of the filter 112b is connected to a resistor 602. The resistor 602 is connected to the output 604 of the filter 112b, and to a second resistor 606. The second resistor 606 is connected to a capacitor 608, having the other terminal of the capacitor 608 connected to ground 610. The equation for the transfer function of this circuit is:

$$TransferFunction = \frac{1 + sR1C}{1 + s(R1 + R2)C}$$

where R1, R2, and C are the values of the first resistor 602, the second resistor 604, and the capacitor 608, respectively, and s=ωj, where ω is the angular frequency of the signal.

FIG. 7 shows a Bode plot of the transfer function of the circuit shown in FIG. 6. One skilled in the art will recognize the characteristic downward slope at frequencies below the zero frequency, while frequencies higher than the zero frequency receive a flat response, providing a relatively constant attenuation of the signal. The pole frequency is designed to be at a very low frequency, while the zero frequency is designed to be at the corner frequency of the flicker noise.

FIG. 8 shows a schematic diagram of the output filter 116b of one embodiment, among others, of the present invention. The input 800 is connected to a first resistor 802, which is connected in parallel with a capacitor 804 and a second resistor 806, which are in series with each other. The other side of this parallel connection is coupled to the negative terminal of an op-amp 808, the positive terminal of the op-amp 808 being coupled to ground 810. A third resistor 812 further connects the output terminal of the op-amp 808, which is also the output 814 of the filter 116b, with the negative terminal of the op-amp 808. The transfer function of the filter shown in FIG. 8 is given by the equation:

$$TransferFunction = \frac{1 + s(R1 + R2)C}{1 + sR1C}$$

where R2, R1, and C are the values of the first resistor 802, the second resistor 806, and the capacitor 804, respectively, and s=ωj, where ω is the angular frequency of the signal.

FIG. 9 shows a Bode plot of the transfer function illustrated by the circuit in FIG. 8. One skilled in the art will recognize that this function is the inverse of the function shown in FIG. 7, noting the characteristic upward sloping amplification at frequencies below the zero frequency, while frequencies higher than the zero frequency receive a flat response, providing a relatively constant amplification of the signal. In this embodiment, the functions have been designed to be differential, or balanced, circuits, however, there is no requirement that these circuits be balanced, but the decision should be made in the design of the circuit. The restoration of only a fragment of the attenuated portion of the desired signal by the output filter, after the processing logic has removed the flicker noise, is intended to be included in the present invention.

The invention outlined herein can be implemented in hardware, software, or any combination thereof, but it should be emphasized that the above-described embodiments of the present invention, particularly, any "preferred" embodiments, are merely possible examples of implementations, merely set forth for a clear understanding of the principles of the invention. Further, one skilled in the art will recognize that the term "logic" as used in the present invention is not limited to digital logic, but applies to both digital and analog circuitry as well as software, and any combination thereof. While various embodiments of the invention have been described, it will be apparent to those of ordinary skill in the art that many more embodiments and implementations are possible that are within the scope of this invention.

What is claimed is:

1. A direct conversion receiver, comprising:
a first filter adapted to receive a plurality of receive signals of a receive band, the first filter configured to attenuate at least a portion of a desired signal in a frequency range of the receive band to de-emphasize signals within the frequency range; and
a second filter coupled to the output of a signal processing logic and configured to amplify the signals in the frequency range of the receive band, wherein the signal processing logic is coupled to the output of the first filter and is configured to substantially attenuate a plurality of unwanted signals in the receive band, the first and second filters having opposite transfer functions, such that the resulting transfer function is identity, when disregarding the signal processing logic, and the transfer function of the first filter is 1/(1+sRC) and the transfer function of the second fiber is 1+sRC.

2. The direct conversion receiver as defined in claim 1, wherein a pole frequency of the first filter is located at a frequency that is within the desired signal, such that a portion of the desired signal is rejected along with the unwanted signal in order to provide better rejection of the unwanted signal.

3. A direct conversion receiver, comprising:
a first filter adapted to receive a plurality of receive signals comprising a receive band and configured to pass a plurality of low frequency signals substantially unaltered, while providing a constant attenuation value for a plurality of high frequency signals corresponding to at least a portion of a desired signal; and
a second filter coupled to a signal processing logic output and configured to amplify the high frequency signals that were attenuated by the first filter to yield a desired baseband signal, wherein the signal processing logic is coupled to the output of the first filter and configured to attenuate the plurality of receive signals such that substantially only one signal remains, wherein the first filter and second filter, taken together without the signal processing logic, would yield an output with a transfer function of identity, wherein the transfer function of the first filter is (1+sR1C)/(1+s(R1+R2)C), and the transfer function of the second filter is (1+s(R1+R2)C)/(1+sR1C).

4. The direct conversion receiver as defined in claim 3, wherein the pole frequency of the first filter is at a very low frequency and the zero of the first filter corresponds with a flicker noise corner frequency, wherein the response of the first filter is substantially flat after the zero.

5. A method for enhancing reception on a direct conversion receiver, the method comprising the steps of:
attenuating a plurality of signals in a frequency range of a receive band with a filter, including at least a portion of a desired signal, wherein the frequency range of the receive band comprises high frequency signals;
performing intermediate filtering on the receive band;
amplifying the plurality of signals in the frequency range, wherein the attenuating step and the amplifying step, taken together without the intermediate filtering, comprise a balanced circuit without any gain or loss, wherein the attenuating step comprises subtracting strength from the frequency range, such that a low frequency range where a flicker noise is strongest is amplified in relation to a high frequency range where flicker noise is weaker; and
providing a desired baseband signal.

6. The method as defined in claim 5, wherein the attenuating step comprises filtering out a plurality of unwanted signals from the receive band and a portion of the desired signal, while leaving at least a portion of the desired signal substantially unaltered, and the amplifying step comprises adding strength to the plurality of signals in the frequency range.

7. A method for enhancing the reception of a receiver, the method comprising the steps of:
receiving a receive band, the receive band comprising a plurality of signals;
attenuating a frequency range of the plurality of signals with a filter, including at least a portion of a desired signal, such that the frequency range is de-emphasized with respect to signals outside of the frequency range;
providing signal processing to substantially remove a plurality of unwanted signals from the receive band; and
amplifying the frequency range of the plurality of signals, such that the attenuated frequency range receives amplification substantially equal to the attenuation received in the attenuating step, wherein the attenuating step comprises filtering the receive band with a low pass filter having the transfer function $(1+sR1C)/(1+s(R1+R2)C)$, and the amplifying step comprises filtering the intermediate processed and filtered signal with a high pass filter having the transfer function $(1+s(R1+R2)C)/(1+sR1C)$.

8. The method as defined in claim 7, wherein the frequency range comprises frequencies above the corner frequency of a flicker noise.

* * * * *

UNITED STATES PATENT AND TRADEMARK OFFICE
CERTIFICATE OF CORRECTION

PATENT NO. : 7,155,195 B2
APPLICATION NO. : 10/172239
DATED : December 26, 2006
INVENTOR(S) : Vasa It is certified that error appears in the above-identified patent and that said Letters Patent is hereby corrected as shown below:

Column 2, starting on line 33 through and including line 43, delete the following:

"Another embodiment of the invention comprises a filter configured to receive a receive band, the receive band being at a baseband frequency and comprising a plurality of signals. The filter is also configured to filter out a plurality of unwanted signals from the plurality of signals and configured to produce a desired signal, wherein the filter has a pole frequency that is located within a frequency range of the desired signal. The location of this pole frequency thereby enhances the attenuation of the pluarlity of unwanted signals prior to processing the desired signal in a direct conversion receiver signal processing logic."

Column 2, starting on line 65 through Column 3, line 3, delete the following:

"Another embodiment of the invention includes a method comprising receiving a receive band, comprising a plurality of signals, and attenuating the receive band, such that a plurality of unwanted signals are rejected along with a portion of a desired signal, wherein a portion of the desired signal is allowed to pass."

Column 8, line 33 (claim 1): delete "the" and replace with --a--.

Column 8, line 59 (claim 3): delete "the" (first occurrence) and replace with --a--.

Column 8, line 60 (claim 3): delete "the" and replace with --a--.

Column 8, line 65 (claim 4): delete "the" (first occurrence) and replace with --a--.

Column 10, line 16 (claim 7): delete "the" and replace with --a--.

Column 10, line 18 (claim 7): delete "the" and replace with --an--.

Column 10, line 19 (claim 7): delete "the" and replace with --a--.

UNITED STATES PATENT AND TRADEMARK OFFICE
CERTIFICATE OF CORRECTION

PATENT NO. : 7,155,195 B2
APPLICATION NO. : 10/172239
DATED : December 26, 2006
INVENTOR(S) : Vasa It is certified that error appears in the above-identified patent and that said Letters Patent is hereby corrected as shown below:

Column 10, line 22 (claim 8): delete "the" and replace with --a--.

Signed and Sealed this

Third Day of April, 2007

JON W. DUDAS
*Director of the United States Patent and Trademark Office*